(12) United States Patent
Huang

(10) Patent No.: US 7,493,421 B2
(45) Date of Patent: Feb. 17, 2009

(54) MEDIA SHARING APPARATUS, SYSTEM, AND METHOD FOR ENABLING COMPUTING DEVICES TO SHARE A DRIVE

(75) Inventor: Shih-Yuan Huang, Taipei Hsien (TW)

(73) Assignee: Aten International Co., Ltd., Taipei Hsien (TW)

( * ) Notice: Subject to any disclaimer, the term of this patent is extended or adjusted under 35 U.S.C. 154(b) by 218 days.

(21) Appl. No.: 11/258,120

(22) Filed: Oct. 26, 2005

(65) Prior Publication Data
US 2007/0094422 A1    Apr. 26, 2007

(51) Int. Cl.
*G06F 3/00* (2006.01)
*G06F 5/00* (2006.01)

(52) U.S. Cl. .............................. 710/12; 710/51; 361/686

(58) Field of Classification Search ................ 710/2, 710/8–14, 51; 361/679–686
See application file for complete search history.

(56) References Cited

U.S. PATENT DOCUMENTS 6,256,014 B1 * 7/2001 Thomas et al. ............... 345/163
2005/0225935 A1 * 10/2005 Chen .......................... 361/683

* cited by examiner

*Primary Examiner*—Christopher B Shin
(74) *Attorney, Agent, or Firm*—Birch, Stewart, Kolasch & Birch, LLP

(57) ABSTRACT

A media sharing apparatus includes a plurality of connecting ports for connecting with a plurality of computing devices. A KVM switch connecting with a drive is coupled to the media sharing apparatus. A system firmware has an emulating function for emulating said drive to said computing devices and has a command program and an access program of this drive.

25 Claims, 3 Drawing Sheets

MEDIA SHARING APPARATUS, SYSTEM, AND METHOD FOR ENABLING COMPUTING DEVICES TO SHARE A DRIVE

FIELD OF THE INVENTION

The present invention is related to a media apparatus, and more particularly is related to a media sharing apparatus.

BACKGROUND OF THE INVENTION

An information technology (IT) department always exists in an enterprise to process the daily business information. Generally, there are many computing devices in the department to support various business work. Each computing device has a media drive to read data or programs.

When a program should be updated or installed into computing devices, the disk storing this program has to be put into the media drive of each computing device in turn, which is very inconvenient for IT staff. Moreover, when a program should be installed into a specific computing device, the specific computing device has to be identified from these computing devices by the staff first. Otherwise, the following installation cannot be started. Then, this program is installed into this identified computing device. As a result, such the procedure and the management method are very troublesome and inconvenient. On the other hand, the traditional media sharing apparatus is unable to share a single drive simultaneously. The traditional media sharing apparatus switch or disconnect the drive to different computers at the different time.

Therefore, it is a common purpose to increase the management efficiency in an IT department to make medium sharing more convenient.

SUMMARY OF THE INVENTION

The purpose of the present invention is to provide a media sharing apparatus that can enable a plurality of computing devices to share a media drive.

According to the present invention, the media sharing apparatus includes a plurality of connecting ports for connecting with a plurality of computing devices. A KVM switch connecting with a drive to be shared is coupled to the media sharing apparatus. The system firmware emulates the drive to the computing devices and has a command program and an access program of this drive.

In an embodiment, when a computing device wants to read the data stored in a disk in the drive, the KVM switch forms a connection between the computing device and the physical drive through the media sharing apparatus. In the present invention, once more than one computing devices issue reading request at the same time, a time-sharing method is used to arrange the accessing time of physical drive for the computing devices. The more than one computing devices read the drive alternately.

A media sharing method for enabling a plurality of computing devices to share a drive is disclosed. First, a system firmware is used to emulate said drive to said computing devices. The drive is accessed by the plurality of computing devices alternately. The system firmware is executed on a KVM switch.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein.

DETAILED DESCRIPTION OF THE PREFERRED EMBODIMENT

According to the present invention, a drive is connected to a KVM switch. Each computing device can share this drive through a media sharing of the present invention.

Figure 1A:
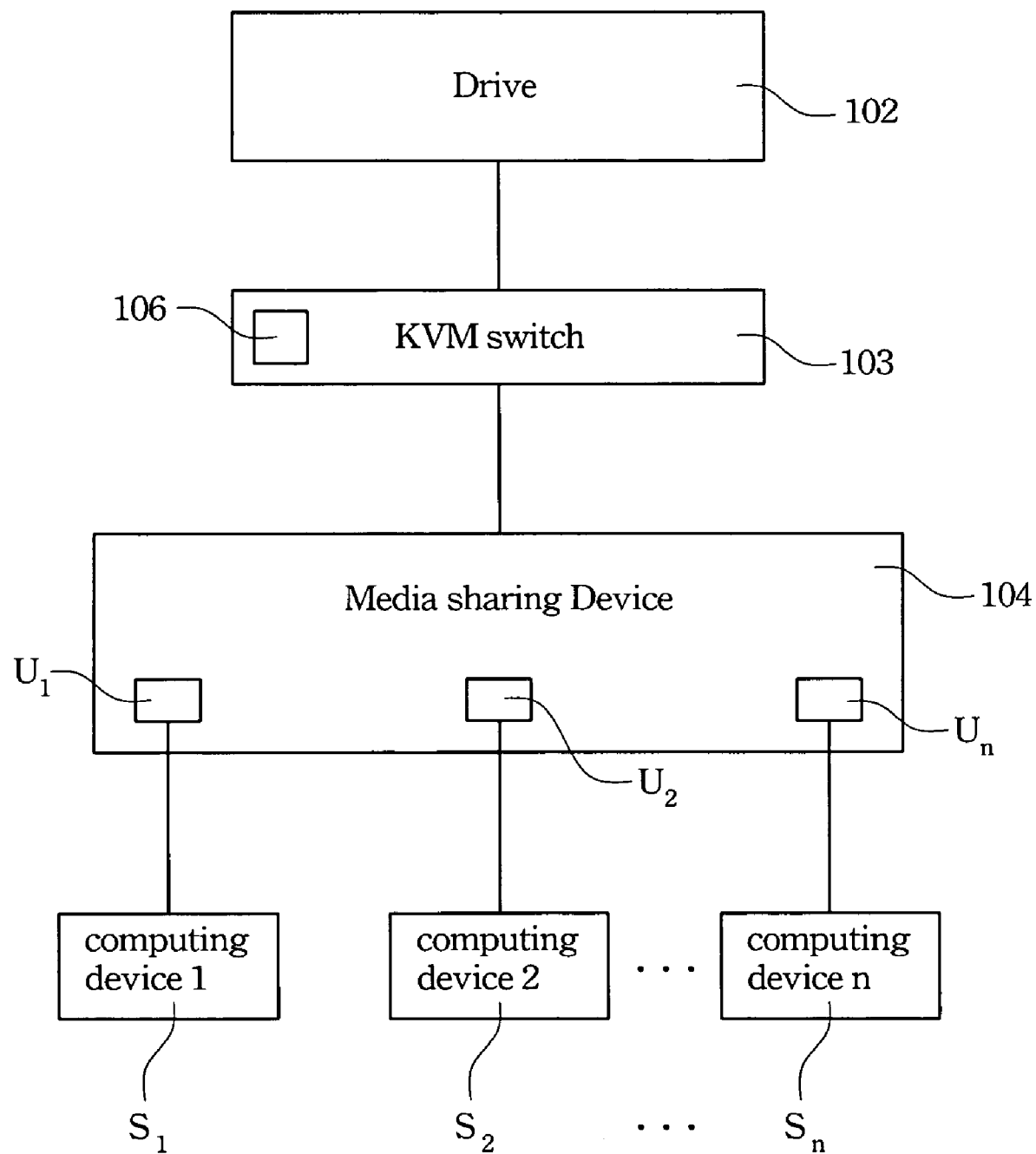
FIG. 1A illustrates a physical configuration of devices in relation to a preferred embodiment of the present invention.
Figure 1B:
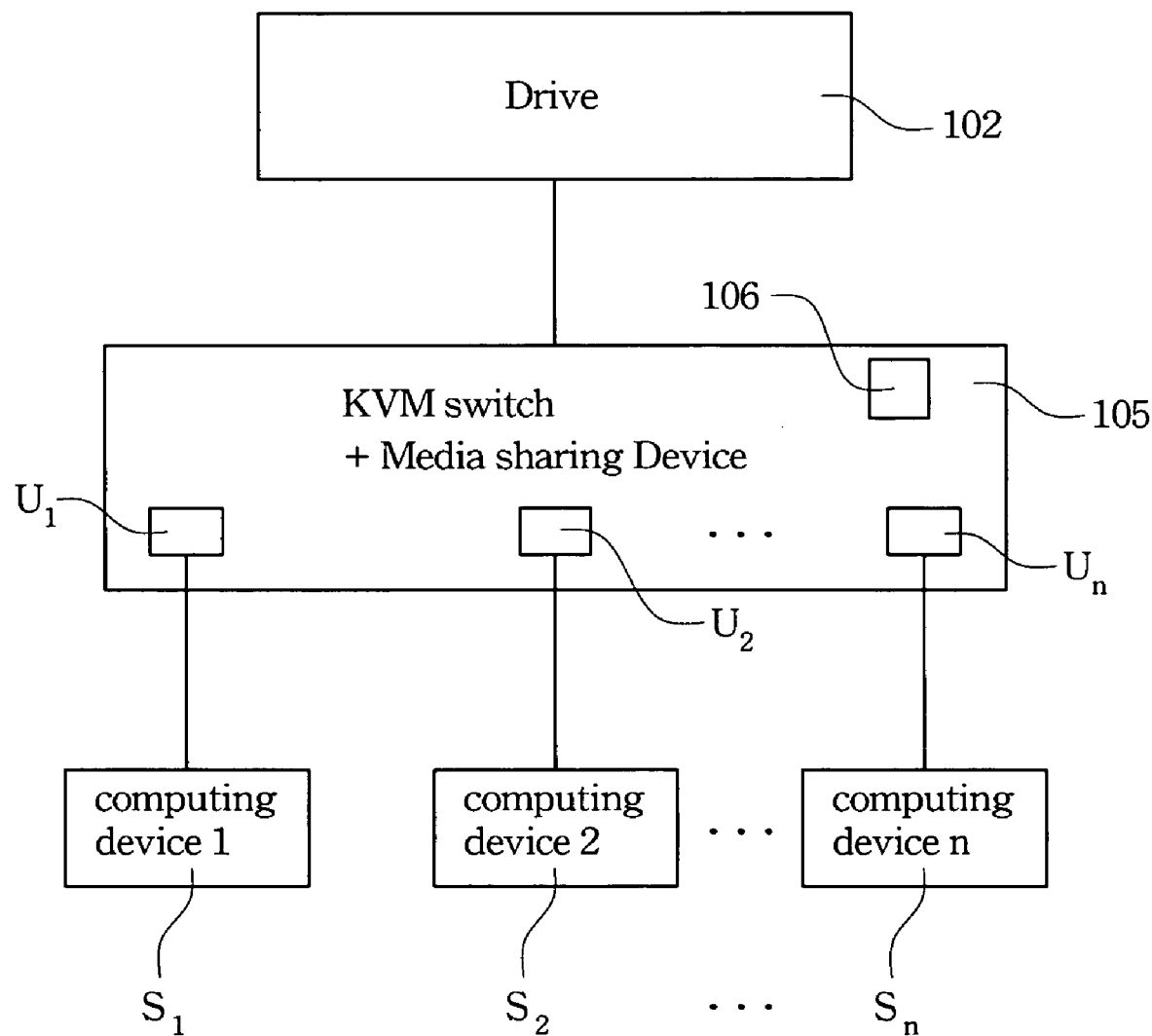
FIG. 1B illustrates a physical configuration of devices in relation to another preferred embodiment of the present invention.

FIG. 1A illustrates a physical configuration of devices in relation to the present invention. A drive 102 is connected to a KVM switch 103. A plurality of computing devices $S_1$, $S_2 \ldots$, $S_n$ may share this drive 102 through a media sharing apparatus 104. Preferably, the drive 102 is a read-only storage device, such as a CD-ROM drive or an optical disk drive. Alternatively, The drive 102 to be shared can be any storage device having read-only function, such as a DVD-ROM, DVD-RW or a CD-RW drive. The interface of the drive 102 can be an Integrated Drive Electronic (IDE) interface, a USB interface or a 1394 interface. The KVM switch 103 is a keyboard/video/mouse (KVM) switch or a keyboard/video/mouse/peripheral (KVMP) switch. The media sharing apparatus 104 has a plurality of connecting ports, such as USB ports $U_1$, $U_2 \ldots$, $U_n$, for connecting with a plurality of computing devices respectively. It is noticed that the connecting ports can also be IEEE 1394 ports or the like. It is noticed that the media sharing apparatus 104 can also be built in the KVM switch 103 as shown in the FIG. 1B. In this embodiment, the KVM switch plus media sharing device 105 may include a plurality of connecting ports for connecting with a plurality of computing devices.

The system firmware 106 of the KVM switch 103 has an emulation function, which represents the drive 102 to communicate with the computing devices $S_1$, $S_2 \ldots$, $S_n$. Therefore, although the drive 102 does not be directly connected to the computing devices $S_1$, $S_2 \ldots$, $S_n$, the emulation function of the system firmware 106 of the KVM switch 103 still makes the computing devices $S_1$, $S_2 \ldots$, $S_n$ detect the presence of the drive 102. When the computing devices $S_1$, $S_2 \ldots$, $S_n$ are booted up, the KVM switch 103 may represent the drive 102 to communicate with the computing devices $S_1$, $S_2 \ldots$, $S_n$ based on a certain protocol. According to the embodiment, the ports are USB ports, therefore, the protocol is a USB protocol. In other embodiment, if the connecting ports are IEEE 1394 ports, the protocol is an IEEE 1394 protocol.

Therefore, these computing devices $S_1$, $S_2 \ldots$, $S_n$ connecting with the USB ports $U_1$, $U_2 \ldots$, $U_n$ as if are connected with CD-ROM drives directly and respectively. Moreover, the system firmware 106 executed on the KVM switch 103 also has a command function for driving this drive 102; and according to the protocol of the interface, such as an IDE interface, a USB interface, or a 1394 interface, of the drive 102, the system firmware 106 has an access function for accessing the drive 102. Meanwhile, the system firmware 106 is also able to transform the protocol of the drive 102 into the protocol of the connecting port of the computing devices $S_1$, $S_2 \ldots$, $S_n$. It is noticed that, in another embodiment, the system firmware 106 also can be executed in the media sharing device 104.

When a computing device, such as the computing device $S_1$, requests to read the data stored in a disk, this disk is put into the drive 102 first. Then, the KVM switch 103 builds a connection between the computing device $S_1$ and the drive 102 through the media sharing 104. At this time, the computing device $S_1$ reads the data stored in the disk in the drive 102. Therefore, according to the present invention, it is not necessary for IT staff to put this disk into a specific drive that only connected to a specific computing device $S_1$.

Figure 2:
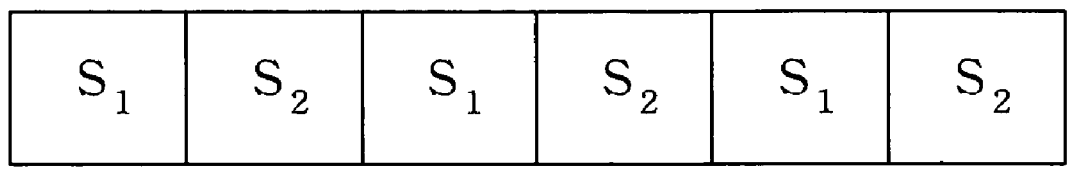
FIG. 2 illustrates a time frame of the time-sharing method of the present invention.

Additionally, while the computing device $S_1$ is accessing the drive 102, if another computing device, such as computing device $S_2$, also issues a request for accessing the drive 102, a time-sharing method is used in the present invention to allocate the time to access the drive 102 for the computing device $S_1$ and computing device $S_2$. Therefore, the purpose of sharing the drive 102 can be reached. FIG. 2 illustrates a time frame of the computing device $S_1$ and computing device $S_2$ accessing the drive 102. According to FIG. 2, the computing device $S_1$ and computing device $S_2$ access the drive 102 alternately. Only one computing device is permitted to access the drive 102 at one time. Therefore, data interference is not generated.

It is noticed that the time-sharing method can be applied to many computing devices to share one drive. Moreover, the system firmware also can be executed in the media sharing device 104. On the other hand, as shown in the FIG. 1B, the media sharing 104 may be integrated into the KVM switch 103. In this embodiment, the KVM switch plus media sharing device 105 may include a plurality of connecting ports for connecting with a plurality of computing devices.

Figure 3:
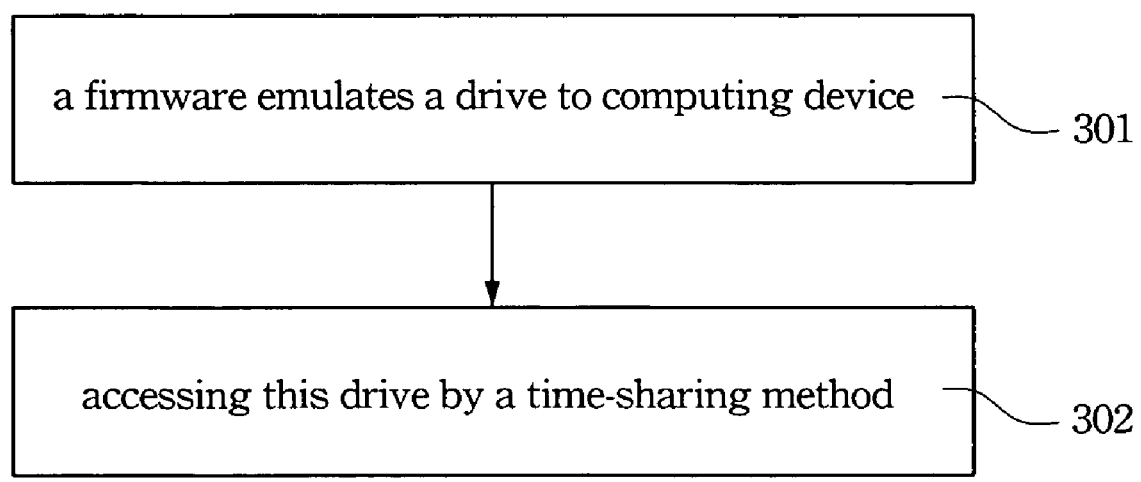
FIG. 3 illustrates a flow chart of sharing a media in relation to a preferred embodiment of the present invention.

FIG. 3 illustrates a flow chart of sharing a media in relation to a preferred embodiment of the present invention. Please also refer to FIG. 1 A. According to the present invention, when a plurality of computing devices $S_1, S_2 \ldots, S_n$ want to share this drive 102 through a media sharing apparatus 104, a system firmware 106 is used to emulate this drive 102 to these computing devices in step 301. At this time, when the computing devices $S_1, S_2 \ldots, S_n$ are booted up, the KVM switch 103 may represent the drive 102 to communicate with the computing devices $S_1, S_2 \ldots, S_n$. Therefore, in step 302, the drive is accessed by the plurality of computing devices alternately. A time-sharing method is used to allocate the time to access the drive 102 for the computing devices.

Accordingly, the media sharing of the present invention includes a plurality of connecting ports for connecting with a plurality of computing devices. A KVM switch connecting with a drive is coupled to the media sharing. The system firmware of the KVM switch has an emulation function for representing the drive to communicate with the computing devices and has a command function and an access function for driving this drive. When a computing device requests to read the data stored in a disk in the drive, the KVM switch forms a connection between the computing device and the drive through the media sharing. When two computing devices issue reading requirements at the same time, a time-sharing method is used to allocate the time to access the drive for the two computing devices.

Therefore, a drive can be shared simultaneously by a plurality of computing devices through the media sharing of the present invention. The capability of remotely controlling the equipment in the IT department by staff may be realized.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures. While a preferred embodiment of the invention has been illustrated and described, it will be appreciated that various changes can be made therein without departing from the spirit and scope of the invention.

What is claimed is:

1. A media sharing apparatus coupling a plurality of computing device to a drive, for enabling the plurality of computing device to share the drive, the media sharing apparatus comprising:

a plurality of connecting ports for connecting with said computing devices; and a system firmware with an access function and a command function for driving said drive, wherein the system firmware makes the computing devices detect the drive, the system firmware represents the drive to communicate with the computing devices, and the system firmware makes the computing devices as if the computer devices are directly and respectively connected to the drive; and wherein said drive is shared in a time-sharing mode.

2. The apparatus according to claim 1, wherein said connecting ports are USB ports.

3. The apparatus according to claim 1, wherein said connecting ports are IEEE 1394 ports.

4. The apparatus according to claim 1, wherein said drive is a storage device having read-only function.

5. The apparatus according to claim 1, wherein said drive is a CD-ROM drive.

6. The apparatus according to claim 1, wherein said drive is an optical disk drive.

7. The apparatus according to claim 1, wherein said system firmware is executed on a KVM switch connected to the apparatus.

8. The apparatus according to claim 7, wherein said KVM switch is a keyboard/video/mouse/peripheral (KVMP) switch.

9. A system coupling a plurality of computing device to a drive, for enabling the plurality of computing device to share the drive, the system comprising:

a sharing apparatus with a plurality of connecting ports for connecting with said computing devices;

a KVM switch coupling with said drive and said sharing apparatus; and a system firmware, with an access function and a command function for driving said drive, wherein the system firmware makes the computing devices detect the drive, the system firmware represents the drive to communicate with the computing devices, and the system firmware makes the computing devices as if the computer devices are directly and respectively connected to the drive; and wherein said drive is shared in a time-sharing mode.

10. The system according to claim 9, wherein said connecting ports are USB ports.

11. The system according to claim 9, wherein said connecting ports are IEEE 1394 ports.

12. The system according to claim 9, wherein said drive is a storage device having read-only function.

13. The system according to claim 9, wherein said drive is a CD-ROM drive.

14. The system according to claim 9, wherein said drive is an optical disk drive.

15. The system according to claim 9, wherein said KVM switch is a keyboard/video/mouse/peripheral (KVMP) switch.

16. The system according to claim 9, wherein said system firmware executed on said KVM switch.

17. The system according to claim 9, wherein said system firmware executed on said sharing apparatus.

18. A media sharing method for enabling a plurality of computing devices to share a drive, comprising:
- making that the computing devices detect the drive;
- representing the drive to communicate with the computing devices;
- making the computing devices as if the computer devices are directly and respectively connected to the drive; and
- accessing said drive by the plurality of computing devices in a time-sharing mode.

19. The method according to claim 18, wherein said connecting ports are USB ports.

20. The method according to claim 18, wherein said connecting ports are IEEE 1394 ports.

21. The method according to claim 18, wherein said drive is a storage device having read-only function.

22. The method according to claim 18, wherein said drive is a CD-ROM drive.

23. The method according to claim 18, wherein said drive is an optical disk drive.

24. The method according to claim 18, wherein said system firmware is executed on a KVM switch.

25. The method according to claim 24, wherein said KVM switch is a keyboard/video/mouse/peripheral (KVMP) switch.

* * * * *